US012092245B2

(12) United States Patent
Meisner et al.

(10) Patent No.: US 12,092,245 B2
(45) Date of Patent: Sep. 17, 2024

(54) LOCKABLE SWIVEL FITTING ASSEMBLY

(71) Applicant: Parker-Hannifin Corporation, Cleveland, OH (US)

(72) Inventors: Zackary Meisner, Paw Paw, MI (US); Andrew Woods, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 176 days.

(21) Appl. No.: 18/056,850

(22) Filed: Nov. 18, 2022

(65) Prior Publication Data
US 2023/0175620 A1 Jun. 8, 2023

Related U.S. Application Data

(60) Provisional application No. 63/349,271, filed on Jun. 6, 2022, provisional application No. 63/287,146, filed on Dec. 8, 2021.

(51) Int. Cl.
*F16L 27/08* (2006.01)
*F16L 37/14* (2006.01)

(52) U.S. Cl.
CPC ......... *F16L 27/0845* (2013.01); *F16L 37/144* (2013.01)

(58) Field of Classification Search
None
See application file for complete search history.

(56) References Cited

U.S. PATENT DOCUMENTS

| | | | | |
|---|---|---|---|---|
| 3,409,314 A | * | 11/1968 | Roe | F16L 19/028 |
| | | | | 285/321 |
| 4,478,435 A | * | 10/1984 | Cheshier | F16L 27/0808 |
| | | | | 285/918 |
| 4,804,206 A | | 2/1989 | Wood et al. | |
| 5,005,877 A | * | 4/1991 | Hayman | F16L 37/0842 |
| | | | | 285/317 |
| 5,871,241 A | * | 2/1999 | Van Essen | F16L 37/0985 |
| | | | | 285/377 |
| 6,447,017 B1 | | 9/2002 | Gilbreath et al. | |
| 7,533,907 B2 | * | 5/2009 | Swift | F16L 37/0887 |
| | | | | 285/82 |
| 7,789,432 B2 | | 9/2010 | Dohm et al. | |

(Continued)

FOREIGN PATENT DOCUMENTS

EP 3715690 A1 9/2020
JP 2002295756 A 10/2002

*Primary Examiner* — James M Hewitt, II
(74) *Attorney, Agent, or Firm* — Renner, Otto, Boisselle & Sklar, LLP

(57) ABSTRACT

A swivel fitting assembly includes a female body providing a first connection end portion, and a male fitting body providing a second connection end portion. The male body and the female body are operatively coupled together to form a fluid passage between the first and second connection end portions, and are configured to permit relative rotation of the bodies relative to each other. A swivel lock mechanism is provided to rotationally lock or release the male body relative to the female body in response to a fluid pressure level in the fitting. The swivel lock includes a collar that transitions to a lock state and holds the male body when fluid pressure is at or above a predefined level. The collar transitions to a release state to enable relative rotation of the bodies when the pressure is below the predefined level.

19 Claims, 6 Drawing Sheets

(56) References Cited

U.S. PATENT DOCUMENTS

2010/0230951 A1* 9/2010 Keeling ............ F16L 37/0987
277/314
2018/0142819 A1 5/2018 Caprio et al.

* cited by examiner

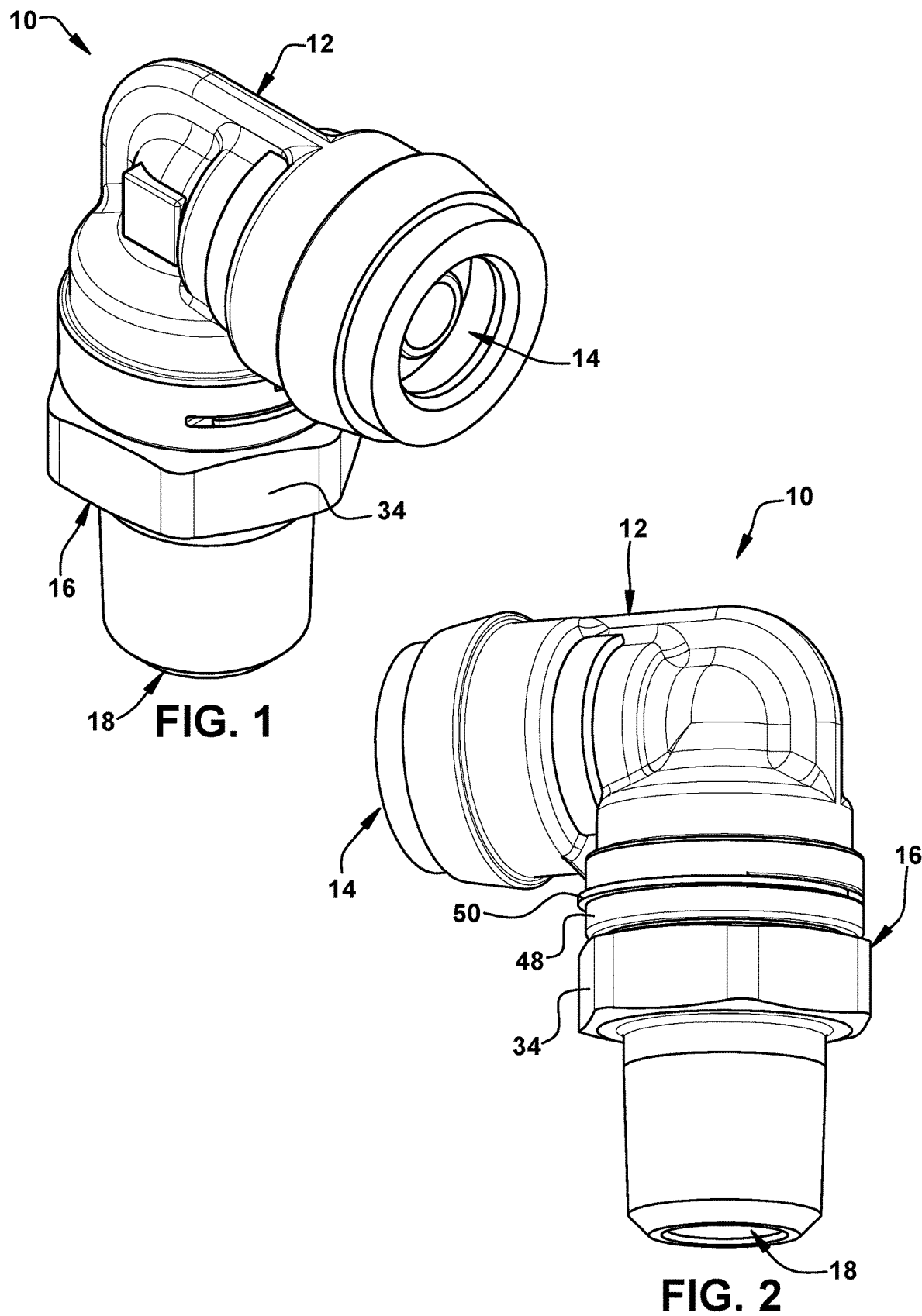

LOCKABLE SWIVEL FITTING ASSEMBLY

RELATED APPLICATIONS

This application claims the benefit of U.S. Provisional Application No. 63/287,146 filed Dec. 8, 2021 and U.S. Provisional Application No. 63/349,271 filed Jun. 6, 2022, each of which is incorporated herein by reference in its entirety.

TECHNICAL FIELD

The present invention relates generally to swivel fitting assemblies, and more particularly to a swivel fitting assembly with swivel lock functionality.

BACKGROUND

Machines such as automotive vehicles, pneumatic machines, or hydraulic machines utilize swivel fittings for connecting a fixed component of the machine with a rotating or moving component of the machine. Conventional swivel fittings generally include opposite connection ends that are connected in such a way as to allow independent rotation of one connection end relative to the other. This can allow, for example, a hose connected to one end the fitting to remain stationary while the other end of the fitting is threadedly installed on a component of the machine. This can help eliminate hose twist and torque that may contribute to premature hose failure. Generally, manufacturers must maintain pressure integrity and reliability of swivel fittings so as to prevent the loss of operating fluid from the system.

SUMMARY

At least one problem with conventional swivel fittings is that the rotating connection end of the fitting is too loose relative the fixed connection end, which can result in undue wear on internal components of the fitting from repeated swiveling, especially when the swivel fitting is made of plastic material. This is particularly problematic in operation, since these conventional swivel fittings are loose enough to swivel under pressure, which results in movement and wear during operation when such movement typically is not intended.

At least one aspect according to the present disclosure provides a swivel fitting assembly having a swivel lock mechanism that rotationally locks a first connection part of the fitting relative to a second connection part in response to fluid pressure in the fitting, and rotationally releases the first and second connection parts at lower pressure, or in the absence of pressure, to thereby permit swivel rotation of the connection parts relative to each other.

According to such an aspect, a swivel fitting assembly includes: a female body providing a first connection end portion and a receiving end portion opposite the first connection end portion; a male fitting body providing a second connection end portion and a stud end portion opposite the second connection end portion, the stud end portion being arranged in the female receiving end portion to rotatably support the female body and form a fluid passage between the first connection end portion and the second connection end portion; and a swivel lock configured to rotationally lock the male fitting body relative to the female body, the swivel lock comprising at least one collar arranged radially between the stud end portion and the female receiving end portion, the at least one collar being configured to transition between a lock state and a release state in response to fluid pressure in the fluid passage, such that fluid pressure in the fluid passage that meets or exceeds a predefined level generates a force that transitions the at least one collar to the lock state in which the at least one collar engages against the stud end portion of the male fitting body and generates a compressive force that rotationally locks the male fitting body relative to the female body, and such that fluid pressure in the fluid passage that is below the predefined level, or the absence of fluid pressure, enables the at least one collar to transition to the release state in which the male fitting body and the female body are rotatable relative to each other.

According to another aspect, a swivel fitting assembly includes a fitting body having a threaded end opposite a stud end, the stud end of the fitting body rotatably supporting a push to connect fitting, the stud end having a male portion positioned within a female portion of the push to connect fitting; an annular seal positioned on an exterior cylindrical surface of the male portion of the stud end and sealing against an interior cylindrical surface of the female portion of the push to connect fitting; a retaining mechanism comprising a first collar member attached to the interior cylindrical surface of the female portion of the push to connect fitting and a second collar member positioned about the exterior cylindrical surface of the male portion of the stud end and having a radially inward extending portion extending into a slot in the exterior cylindrical surface of the male portion of the stud end; wherein the retaining mechanism retains the push to connect fitting on the fitting body in a manner allowing the push to connect fitting to rotate about an axis of the fitting body.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a top, front perspective view of an exemplary swivel fitting assembly according to the present disclosure.

FIG. 2 is a bottom, rear view of the swivel fitting in FIG. 1.

DETAILED DESCRIPTION

Figure 3:
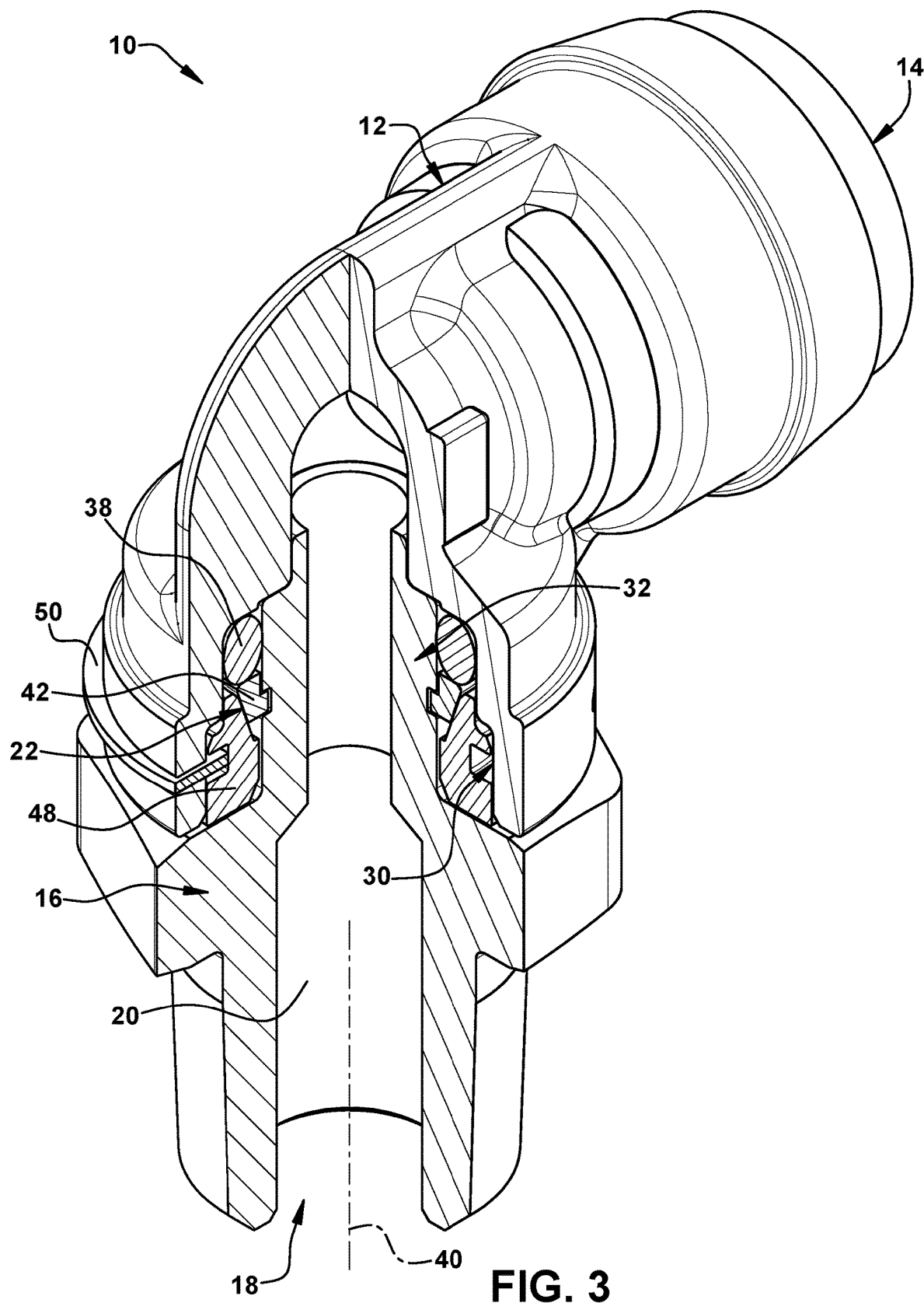
FIG. 3 is a perspective partial quarter-section view of the swivel fitting in FIG. 1.
Figure 4:
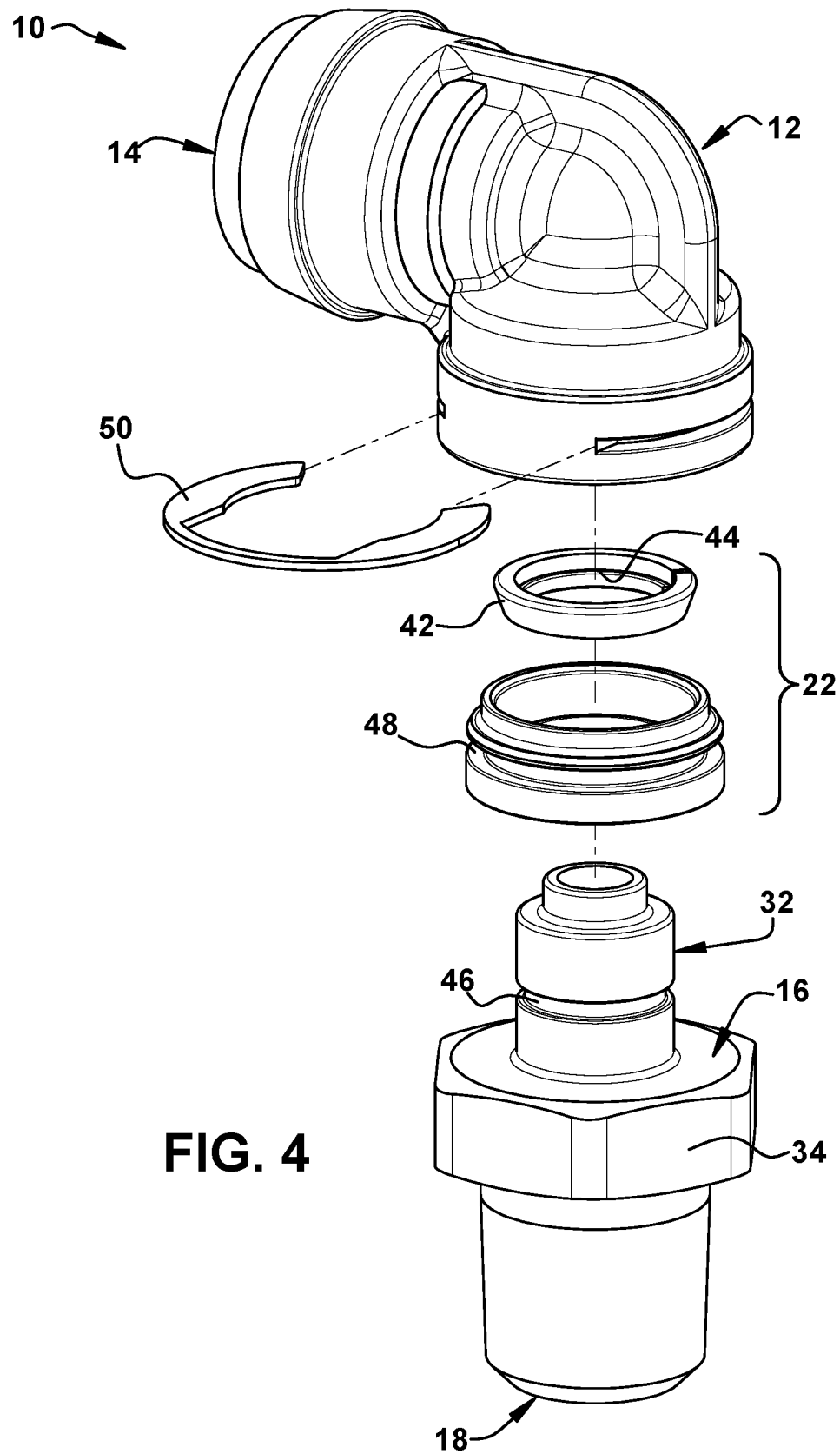
FIG. 4 is an exploded perspective view of the swivel fitting in FIG. 1.
Figure 5:
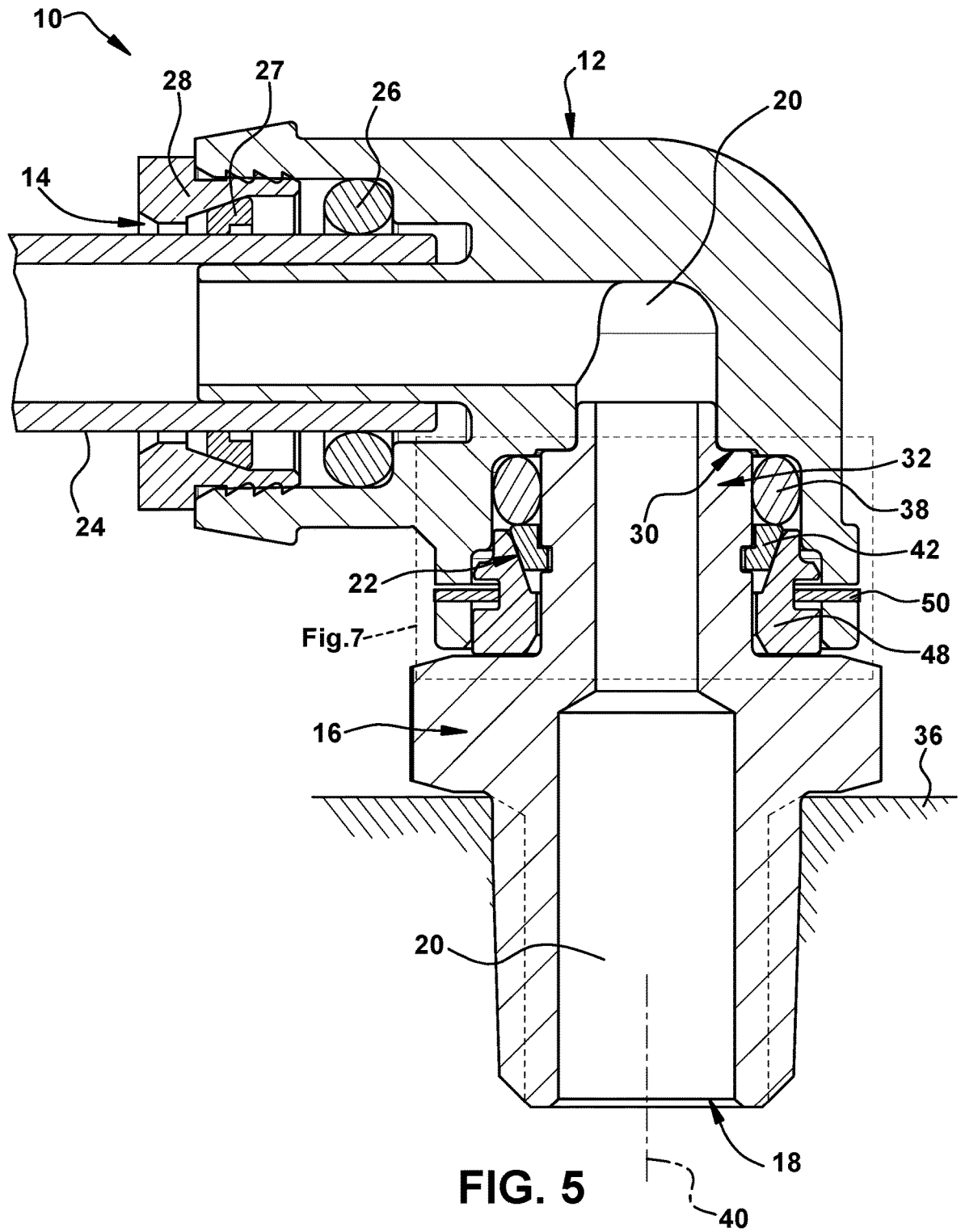
FIG. 5 is a cross-sectional side view of the swivel fitting in FIG. 1.

The principles and aspects according to the present disclosure have particular application to swivel fitting assemblies, also referred to as couplings, which may be of the push-to-connect type, and thus will be described below chiefly in this context. It is understood, however, that the principles and aspects according to the present disclosure may be applicable to other swivel fitting or coupling designs for connecting to one or more tubes, conduits, manifolds, or the like, as may be desired for the particular application.

Referring to FIGS. 1-9, an exemplary swivel fitting assembly 10 is shown. The swivel fitting assembly 10 includes a female body 12 providing a first connection end portion 14, and a male fitting body 16 providing a second connection end portion 18. The male fitting body 16 and the female body 12 are operatively coupled together to form a fluid passage 20 between the first and second connection end portions 14, 18, and are configured to permit relative rotation (or swivel) of the bodies 12, 16 relative to each other. As is apparent, the fluid passage 20 through the fitting assembly 10 allows fluid, such as air or liquid, to pass between a first conduit (e.g., tube, manifold block, etc.) connected to the male fitting body 16 and a second conduit (e.g., tube, manifold block, etc.) connected to the female body 12. As described in further detail below, the exemplary swivel fitting assembly 10 also includes an exemplary swivel lock mechanism 22 (best shown in FIGS. 6-9) that is configured to lock or release rotational movement of the male fitting body 16 relative to the female body 12 in response to a fluid pressure level in the fluid passage 20 when the fitting assembly 10 is installed in the system.

The female body 12 may have any suitable shape or form as may be desired for the particular application. In exemplary embodiments, the connection end portion 14 of the female body 12 is configured as a conventional push-to-connect type connector (also referred to with 14) that connects to a tube 24 (shown in FIG. 5). As shown, the push-to-connect connector 14 may include an O-ring 26, a grab ring 27, and a tube support sleeve 28. These components are generally typical of push-to-connect connectors and operate in a well-known manner. Although shown as a push-to-connect type, it is understood that the connection end portion 14 of the female body 12 is not limited by the manner in which tubes, conduits, manifold blocks, etc. are connected to the female body 12. For example, the female body 12 may have the connection end portion 14 configured with a quick-connect or threaded connector, which may be in the form of a threaded socket or nipple.

As shown, the female body 12 includes a receiving end portion 30 that is at an opposite end from the connection end portion 14 of the female body 12. The receiving end portion 30 is configured as a female receiver that receives and rotatably supports a stud end portion 32 of the male fitting body 16. As shown, the female body 12 may have a bend that orients the female connection end portion 14 at an angle relative to the male connection end portion 18. Any suitable bend may be provided, such as a right-angle bend as shown in the illustrated embodiment. In exemplary embodiments, the female body 12 may be made of molded plastic, or may be made of any other suitable material or combination of materials, such as metals or the like.

In the illustrated embodiment, the connection end portion 18 of the male fitting body 16 is configured as a threaded male connector. The male fitting body 16 includes a main body portion having flats 34 (e.g., hexagonal flats) for engagement with a suitable tool, such as a wrench, for tightening the male fitting body 16 to a manifold block 36, or the like (shown schematically in FIG. 5). In exemplary embodiments, the male fitting body 16 is made of a suitable metal, such as brass or stainless steel, or may be made of any other suitable material or combination of materials. As with the female body 12, it is understood that the connection end portion 18 of the male fitting body 16 is not limited by the manner in which tubes, conduits, manifold blocks, etc. may be connected to the male fitting body 16.

As shown, the male stud end portion 32 opposite the male connection end portion 14 is telescopically inserted into the female receiving end portion 30 and is rotatably retained therein with one or more suitable retainers. Such retainers may include at least part of the swivel lock mechanism 22 described in further detail below. A suitable seal 38, such as an O-ring seal, is arranged in the female receiving end portion 30 to fluidly seal the fluid passage 20. The rotatable coupling of the male fitting body 16 with the female body 12 may permit 360-degree rotation about an axis 40 of the male fitting body 16. In this manner, the tube 24 connected to female body 12 can remain stationary while the male fitting body 16 is threadedly installed on the manifold block 36, for example.

Although it is advantageous to permit relative rotation of the male fitting body 16 relative to the female body 12 as described above, it also may be advantageous to restrict relative rotation of the bodies 12, 16 in some circumstances, such as when the fitting assembly 10 is operating under pressure. Accordingly, an aspect of the present disclosure provides the exemplary swivel lock mechanism 22 that is configured to rotationally lock the male fitting body 16 relative to the female body 12 when fluid pressure in the fluid passage 20 meets or exceeds a predefined level, and is configured to release and permit relative rotation of the bodies 12, 16 when fluid pressure in the passage 20 is below the predefined level.

In exemplary embodiments, the swivel lock mechanism 22 (also referred to as the swivel lock 22) includes at least one collar 42 arranged radially between the male stud end portion 32 and the female receiving end portion 30. The collar 42 is configured such that, in response to a fluid pressure level in the fluid passage 20, the collar 42 transitions between a lock state (shown in FIGS. 8 and 9, for example) and a release state (shown in FIGS. 6 and 7, for example). For example, when the fluid pressure in the passage 20 meets or exceeds the predefined level, a force in the fitting assembly 10 causes the collar 42 to transition to its lock state in which the collar 42 engages against the male stud end portion 32 and generates a compressive force that rotationally locks the male fitting body 16 relative to the female body 12. When the fluid pressure in the fluid passage 20 is below the predefined level, or in the absence of fluid pressure, the collar 42 transitions to its release state in which compressive force is reduced or removed, thereby enabling the male fitting body 16 to rotate relative to the female body 12.

In the lock state, the collar 42 may lockingly engage the stud end portion 32 of the male fitting body 16 in any suitable manner that restricts relative rotation of the male and female bodies 12, 16. In exemplary embodiments, the locking engagement is a frictional rotational lock in which the compressive force generates a corresponding friction force that restricts the relative rotation between the bodies 12, 16. In exemplary embodiments, the frictional rotational lock may be provided without radially overlapping interference members, such as interlocking elements (e.g., interlocking teeth). Because such frictional locking can occur at any relative rotational position between the bodies 12, 16 (i.e., at any angular positioning), the frictional lock provides more flexibility in orienting the male and female bodies 12, 16 at a desired position as compared to interlocking teeth or the like which can only engage at discrete angular positions.

In exemplary embodiments, the compressive force exerted by the collar 42 includes at least a radial component of force against the male stud end portion 32. In the illustrated embodiment, for example, the collar 42 is configured to radially contract in its lock state to apply the radial component of force against a radially outer surface of the male stud end portion 32. In the release state, the collar 42 may be configured to radially expand to provide less compressive force against the radially outer surface of the stud end portion 32. To facilitate such radial contraction and expansion, the collar 42 may be a split collar, as shown. In exemplary embodiments, the collar 42 may be configured to have a resiliency that is biased toward the expanded state so that the collar 42 may automatically transition to the release state when the fluid pressure is lowered below the predefined level.

Alternatively or additionally to providing a radial component of force, the compressive force exerted by the collar 42 may include an axial component of force against the male stud end portion 32. To provide such axial compressive force, the collar 42 and the stud end portion 32 may have radially overlapping features, such as a radial protrusion 44 within a radial groove 46. Such radially overlapping structures 44, 46 may be configured to engage each other in response to opposite axial movement relative to each other. As shown in the illustrated embodiment, the collar 42 may include the radial protrusion 44, and the stud end portion 32 may include the radial groove 46. As shown, the radial protrusion 44 may be formed as a circumferential rim at a radially inner portion of the collar 42, and the radial groove 46 may be formed in the radially outer surface of the stud end portion 32. It is understood, however, that other radial overlapping features may be provided, or the features could be reversed with the collar 42 having the groove 46 and the stud end portion 32 having the protrusion 44.

To facilitate application of the compressive force by the collar 42, the collar 42 may interface with one or more other components of the fitting assembly 10. In the illustrated embodiment, for example, the swivel lock mechanism 22 includes a second collar 48 arranged radially between the first collar 42 and the receiving end portion 30 of the female body 12. As shown, the second collar 48 may be operatively attached to the female body 12, such as with a retaining ring 50, tabs, or the like, so that the second collar 48 moves and/or applies force corresponding with the movement and/or force of the female body 30. In this manner, the second collar 48 may transmit force resulting from fluid pressure in the fitting assembly 10 to the first collar 42 via a suitable interface 52. It is understood that although the second collar 48 is attached to the female body 12 in the illustrated embodiment, the female receiving end portion could be constructed with the same features of the second collar 48 as unitary and integral with the female receiving end portion 30. However, the second collar 48 being separate and attached to the female body 12 facilitates assembly of the components into the receiving end portion 30 of the female body.

In exemplary embodiments, the interface 52 between second collar 48 and the first collar 42 promotes both a radial component of force and an axial component of force. For example, the interface 52 may be formed as an inclined interface in which a radially inner contact surface 54 of the second collar 48 is a tapered surface 54 and a radially outer contact surface 56 of the first collar 42 is a complimentary tapered surface 54. In this manner, the respective tapered surfaces 54, 56 of the first and second collar 42, 48 form respective frustoconical surfaces as they encircle the axis 40. As shown, the inclined interface 52 may have an angle that promotes a greater component of radial compressive force for radially grabbing and holding the male stud end portion 32 compared to the axial component of compressive force.

Generally, in operation, the fluid pressure in the fitting assembly 10 will generate a separation force between the female body 12 and the male fitting body 16. This separation force is transmitted to the second collar 48 attached to the female body 12, which is then transmitted to the first collar 42 via the interface 52 therebetween. In response to this force, the first collar 42 applies the radial and/or axial compressive force to the male stud end portion 32, which may produce the friction force that rotationally locks the fitting assembly 10. Therefore, the fluid pressure level, which impacts the separation force and transmission of compressive force, affects whether sufficient compressive force is applied to rotationally (e.g., frictionally) lock the fitting assembly 10.

Figure 7:
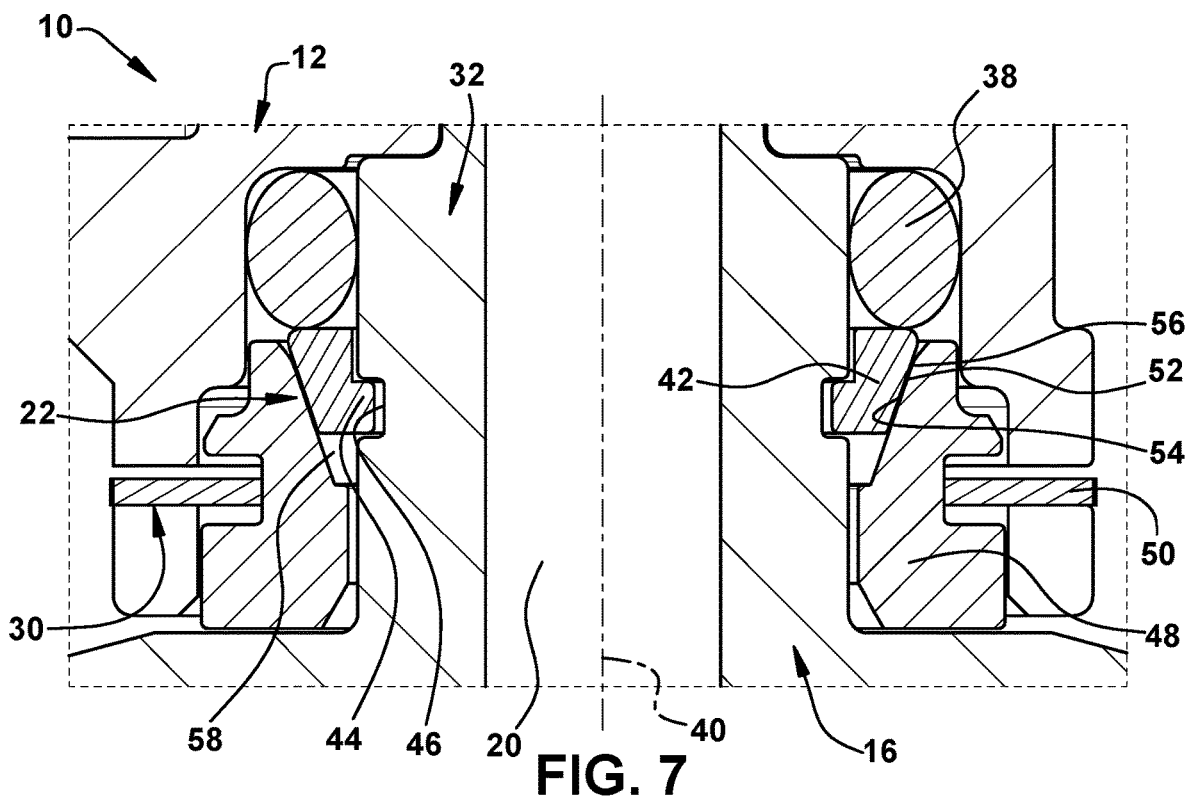
FIG. 7 is an enlarged cross-sectional view from the section in FIG. 5, in which the swivel lock mechanism is shown in its release state.
Figure 9:
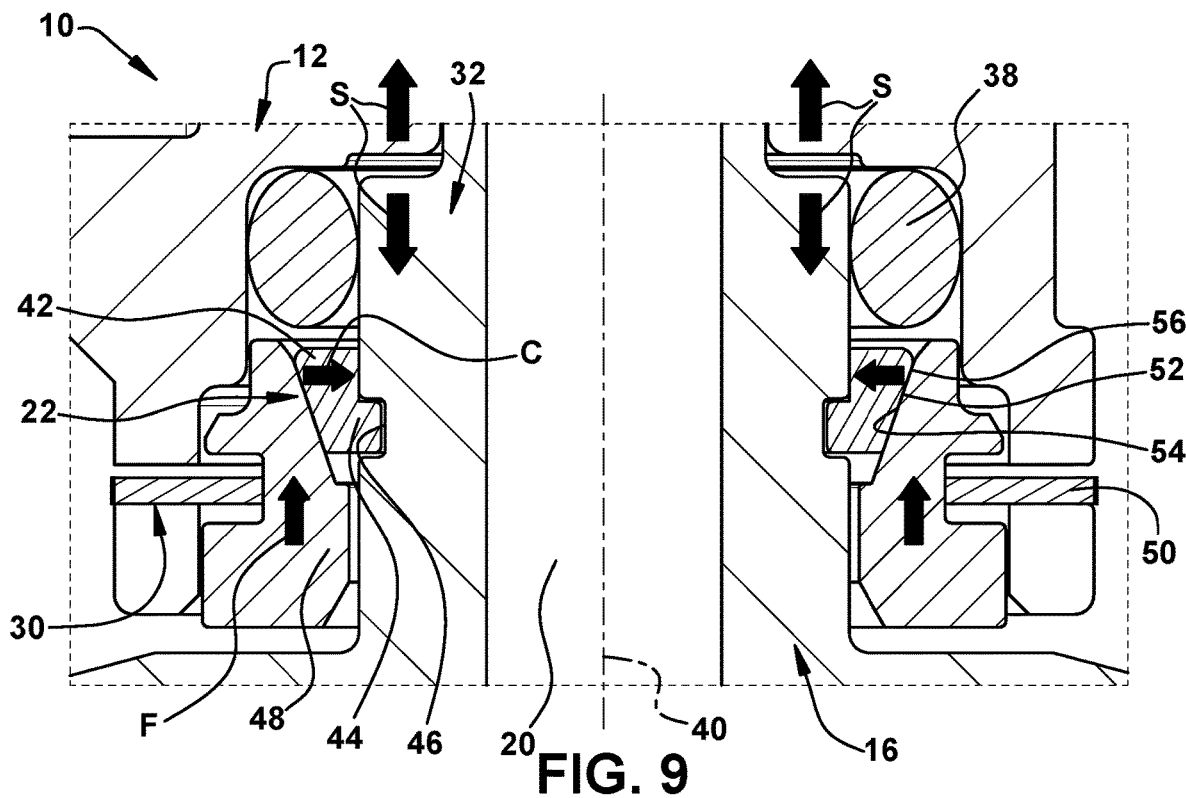
FIG. 9 is an enlarged cross-sectional view from the section in FIG. 5, in which the swivel lock mechanism is shown in its lock state.

As is apparent, particularly with reference to a comparison between FIGS. 7 and 9, movement of the second collar 48 along with movement of the female body 12 causes sliding contact of the second collar 48 with the first collar 42 at the interface 52. In exemplary embodiments, the configuration of the first collar 42 provides a mechanical advantage and serves as a force-amplification device. For example, as shown in the illustrated embodiment, the tapered surface 41 of the second collar 48 forms a wedge-shaped gap 58 (in cross-section) within which the first collar 42 is arranged as a wedge (in cross-section) that is wedged into or out of the gap 58 in response to fluid pressure.

The materials for the various components, including at least the first collar 42, the second collar 48, and the male stud end portion 32 may be selected as desired to improve functionality of the fitting assembly 10. For example, in the illustrated embodiment, the male fitting body 16 is made with nylon, such as nylon 12, or the like, and the first collar 42 is made with polyetherimide (PEI), polyether ether ketone (PEEK), or the. The first collar 42 and/or male stud end portion 32 may be made of grippier material(s), or may have grippier surface finish(es) or coating(s), to further enhance the coefficient of friction therebetween. In addition, the second collar 48 may be made with PEI, PEEK or the like and may provide a low coefficient of friction at the sliding interface 52 with the first collar 42. This lower coefficient of friction may be promoted by applying a surface coating, lubricant or the like between the collars 42, 48.

Figure 8:
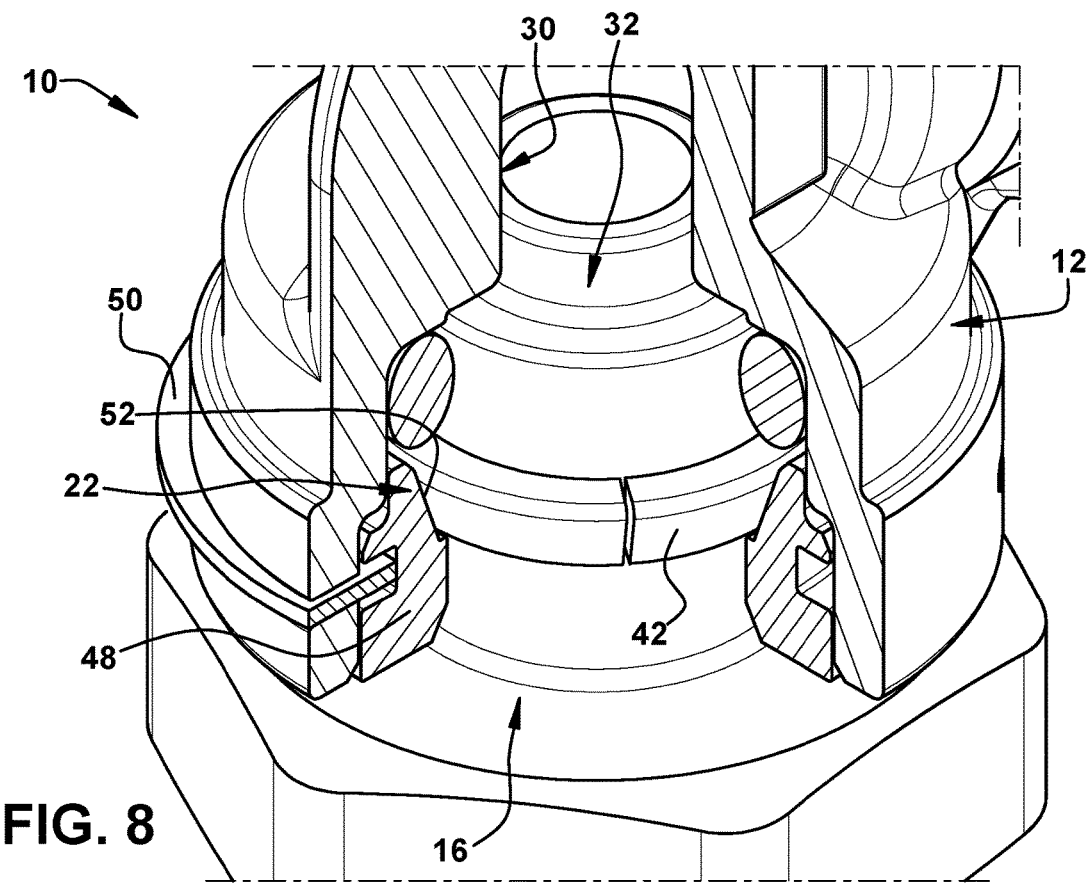
FIG. 8 is an enlarged partial quarter-section view showing the swivel lock mechanism in a lock state.

Referring particularly to FIGS. 6-9, an exemplary operation of the fitting assembly 10 will now be described in further detail. Turning first to FIGS. 8 and 9, the fitting assembly 10 is shown in a pressurized state at a pressure level that exceeds the predefined level at which the swivel lock mechanism 22 transitions to its lock state and restricts rotation of the male fitting body 16 relative to the female body 12. As shown, the fluid pressure in the fitting assembly 10 will generate a separation force S between the female body 12 and the male fitting body 16. In response to this separation force S, the female body 12 moves slightly axially away from the male fitting body 16, such that the second collar 48 moves with the female body 12 and pushes against the first collar 42 with a force F via the tapered interface 52. As the respective tapered, engaging frustoconical surfaces 54, 56 engage at the interface 52, the first collar 42 is pushed radially inward as depicted with arrow C in FIG. 9. The radially inward pushing of the first collar 42 applies a compressive force against the male stud end portion 32, which includes a radially component of force (shown at arrow C) and an axial component of force. The split design of the first collar 42 allows the first collar to move further radially inward as the inner diameter of the first collar 42 decreases and engages the male stud end portion 32 with greater force. This additional engagement force frictionally locks the female body 12 from swiveling on the male fitting body 16 and prevents undue wear on the components.

Figure 6:
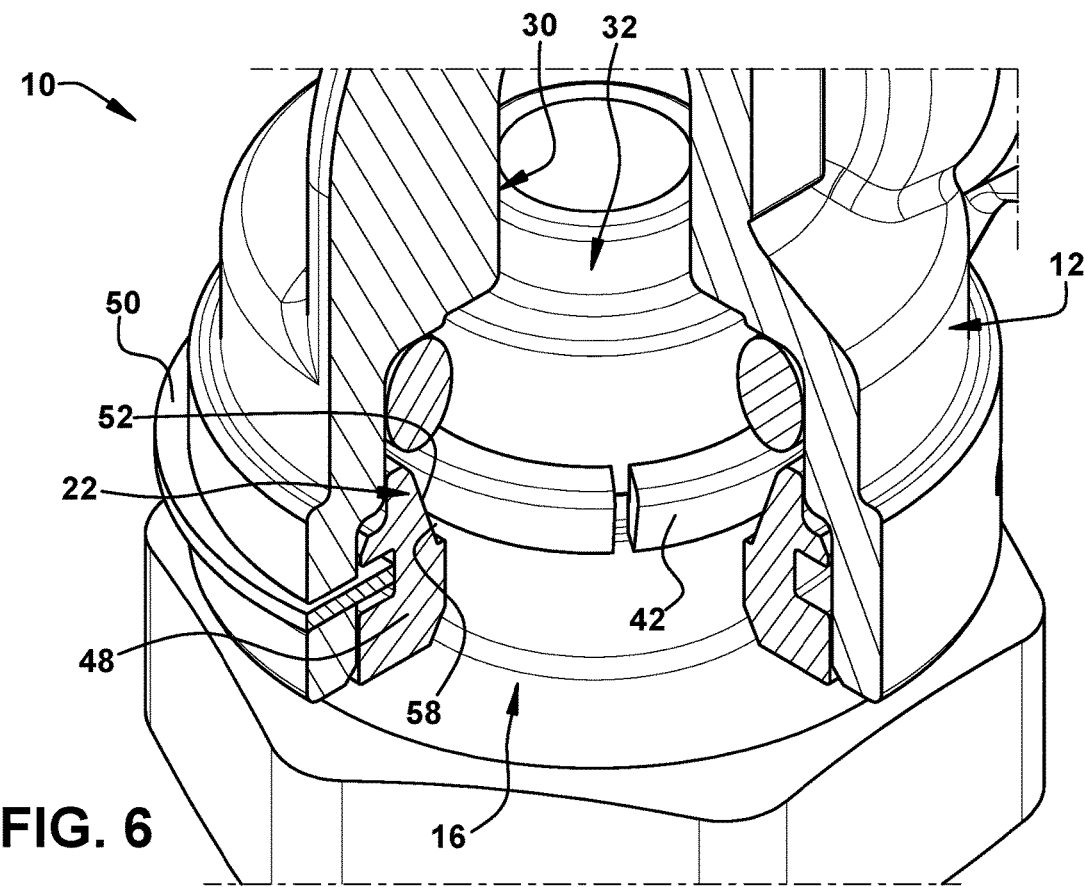
FIG. 6 is an enlarged partial quarter-section view showing an exemplary swivel lock mechanism in a release state.

Turning to FIGS. 6 and 7, the fitting assembly 10 is shown in an unpressurized state, in which the exemplary swivel lock mechanism 22 is in its release state and enables rotation of the male fitting body 16 relative to the female body 12. As shown, in the absence of fluid pressure, or at a pressure below the predefined pressure level, there is an absence or lesser separation force S that allows the first collar 42 to move further out of the wedge-shaped gap 58 and thus radially expand to provide less compressive force against the stud end portion 32. With this lesser force, there is less friction force, which thus enables the release state of the swivel lock mechanism 22.

It is understood that components of the fitting assembly, including the first collar 42, the second collar 48, and the male fitting body 16, are specifically adapted to interact with each other to provide the desired level of compressive force to enable rotational locking or releasing based at least upon the one or more factors as described above. Such considerations also may be based upon the desired predefined level of fluid pressure in the fitting assembly 10, which this predefined fluid pressure may depend on the acceptable fluid pressure range for the particular application, as would be understood by those having ordinary skill in the art. These considerations may be determined empirically through design calculations. By way of example, a selection of PEI and Nylon 12 for a fitting where the outer diameter of the swivel stem is ⅜ inches, when coupled with proper system pressure of greater than 80 psi, is able to provide sufficient friction force to lock the fitting rotation in place.

An exemplary lockable swivel fitting assembly has been shown and described herein, although it is understood that modifications may be made to one or more features of the exemplary fitting assembly as would be understood by those having ordinary skill in the art.

According to an aspect, a swivel fitting assembly includes: a female body providing a first connection end portion and a receiving end portion opposite the first connection end portion; a male fitting body providing a second connection end portion and a stud end portion opposite the second connection end portion, the stud end portion being arranged in the female receiving end portion to rotatably support the female body and form a fluid passage between the first connection end portion and the second connection end portion; a swivel lock configured to rotationally lock or release the male fitting body relative to the female body, the swivel lock comprising at least one collar arranged radially between the stud end portion and the female receiving end portion, the at least one collar being configured to transition between a lock state and a release state in response to fluid pressure in the fluid passage, such that fluid pressure in the fluid passage that meets or exceeds a predefined level generates a force that transitions the at least one collar to the lock state in which the at least one collar engages against the stud end portion of the male fitting body and generates a compressive force that rotationally locks the male fitting body relative to the female body, and such that fluid pressure in the fluid passage that is below the predefined level, or the absence of fluid pressure, enables the at least one collar to transition to the release state in which the male fitting body and the female body are rotatable relative to each other.

Exemplary embodiments may include one or more of the following additional features, separately or in any combination.

In exemplary embodiment(s), in the lock state, the at least one collar is configured to apply a radial compressive force against the stud end portion of the male fitting body to rotationally lock the male fitting body relative to the female body.

In exemplary embodiment(s), in the lock state, the at least one collar is configured to apply a radial compressive force against the stud end portion of the male fitting body to rotationally lock the male fitting body relative to the female body.

In exemplary embodiment(s), in the lock state, the compressive force generates a friction force at an interface between the at least one collar and the stud end portion of the male fitting body, wherein the friction force frictionally rotationally locks the male fitting body relative to the female body.

In exemplary embodiment(s), in the lock state, the at least one collar holds the stud end portion of the male fitting body to restrict rotation without the use of radially overlapping interlocking elements.

In exemplary embodiment(s), the at least one collar is a split collar that radially contracts toward the stud end portion in the lock state, and radially expands away from the stud end portion in the release state.

In exemplary embodiment(s), the split collar has resiliency that biases the split collar toward radially expanding away from the stud end portion, whereby the split collar automatically radially expands in the release state.

In exemplary embodiment(s), an axial engagement interface between the at least one collar and the stud end portion includes a radial protrusion within a radial groove.

In exemplary embodiment(s), the stud end portion has the radial groove in a radially outer surface of the stud end portion.

In exemplary embodiment(s), the at least one collar has the radial protrusion formed at a radially inner portion of the at least one collar.

In exemplary embodiment(s), in the lock state, the force generated by the fluid pressure in the fluid passage is transmitted to the at least one collar via an inclined interface to provide a component of radial and axial compressive.

In exemplary embodiment(s), the at least one collar is a first collar, the swivel lock including a second collar arranged radially between first collar and the receiving end portion of the female body, wherein the second collar is operatively attached to or unitary with the female body.

In exemplary embodiment(s), the second collar includes a tapered surface at a radially inner portion of the second collar that slidingly interfaces with a complimentary tapered surface at a radially outer portion of the first collar, wherein the respective tapered surfaces form an inclined interface that, in the lock state, transmits force from the second collar into both radial and axial components of force to the first collar, in which the compressive force applied by the first collar to the stud end portion includes corresponding radial and axial components of force.

In exemplary embodiment(s), in the lock state, the force generated by the fluid pressure in the fluid passage includes a separation force that forces the female body and male fitting body apart, and wherein the second collar is operatively attached to the female body such that the separation force is transmitted through the female body to the second collar, and transmitted from the second collar to the first collar via the inclined interface.

In exemplary embodiment(s), the first collar provides a mechanical advantage and serves as a force-amplification device in cooperation with the second collar.

In exemplary embodiment(s), the second collar has a tapered surface at a radially inner portion of the second collar that forms a wedge-shaped gap, in cross-section, in a space between the second collar and the stud end portion.

In exemplary embodiment(s), the first collar has a tapered surface at a radially outer portion of the first collar that forms a wedge, in cross-section, that is further wedged into the wedge-shaped gap in the lock state, and is further moved out of the wedge-shaped gap in the release state.

In exemplary embodiment(s), the first connection end portion of the female body is configured as a push-to-connect connector.

In exemplary embodiment(s), the female body is made with plastic.

In exemplary embodiment(s), the second connection end portion of the male fitting body is configured as a threaded male nipple.

According to another aspect, a swivel fitting assembly includes: a fitting body having a threaded end opposite a stud end, the stud end of the fitting body rotatably supporting a push to connect fitting, the stud end having a male portion positioned within a female portion of the push to connect fitting; an annular seal positioned on an exterior cylindrical surface of the male portion of the stud end and sealing against an interior cylindrical surface of the female portion of the push to connect fitting; a retaining mechanism comprising a first collar member attached to the interior cylindrical surface of the female portion of the push to connect fitting and a second collar member positioned about the exterior cylindrical surface of the male portion of the stud end of the fitting body and having a radially inward extending portion extending partially into a slot in the exterior cylindrical surface of the male portion of the stud end; wherein the retaining mechanism retains the push to connect fitting on the fitting body in a manner allowing the push to connect fitting to rotate about an axis of the fitting body.

Exemplary embodiments may include one or more of the following additional features, separately or in any combination.

In exemplary embodiment(s), the second collar member is a split collar.

In exemplary embodiment(s), the first collar and the second collar each have frustoconical surfaces which axially engage each other between the exterior cylindrical surface of the male portion of the stud end and the interior cylindrical surface of the female portion of the push to connect fitting.

In exemplary embodiment(s), when the fitting assembly is under pressure the first collar is pushed axially into the second collar which moves the second collar to more forcefully engage the exterior cylindrical surface of the male portion of the stud end and help prevent the push to connect portion of the fitting from rotating.

An "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A swivel fitting assembly, comprising:
   a female body providing a first connection end portion and a receiving end portion opposite the first connection end portion;
   a male fitting body providing a second connection end portion and a stud end portion opposite the second connection end portion, the stud end portion being arranged in the female receiving end portion to rotatably support the female body and form a fluid passage between the first connection end portion and the second connection end portion;
   a swivel lock configured to rotationally lock or release the male fitting body relative to the female body, the swivel lock comprising at least one collar arranged radially between the stud end portion and the female receiving end portion, the at least one collar being configured to transition between a lock state and a release state in response to fluid pressure in the fluid passage, such that fluid pressure in the fluid passage that meets or exceeds a predefined level generates a force that transitions the at least one collar to the lock state in which the at least one collar engages against the stud end portion of the male fitting body and generates a compressive force that rotationally locks the male fitting body relative to the female body, and such that fluid pressure in the fluid passage that is below the predefined level, or the absence of fluid pressure, enables the at least one collar to transition to the release state in which the male fitting body and the female body are rotatable relative to each other.

2. The swivel fitting assembly according to claim 1, wherein, in the lock state, the at least one collar is configured to apply a radial compressive force against the stud end portion of the male fitting body to rotationally lock the male fitting body relative to the female body.

3. The swivel fitting assembly according to claim 1, wherein, in the lock state, the compressive force generates a friction force at an interface between the at least one collar and the stud end portion of the male fitting body, wherein the friction force frictionally rotationally locks the male fitting body relative to the female body.

4. The swivel fitting assembly according to claim 3, wherein, in the lock state, the at least one collar holds the stud end portion of the male fitting body to restrict rotation without the use of radially overlapping interlocking elements.

5. The swivel fitting assembly according to claim 1, wherein the at least one collar is a split collar that radially contracts toward the stud end portion in the lock state, and radially expands away from the stud end portion in the release state.

6. The swivel fitting assembly according to claim 5, wherein the split collar has resiliency that biases the split collar toward radially expanding away from the stud end portion, whereby the split collar automatically radially expands in the release state.

7. The swivel fitting assembly according to claim 1, wherein an axial engagement interface between the at least one collar and the stud end portion includes a radial protrusion within a radial groove.

8. The swivel fitting assembly according to claim 1,
   wherein the stud end portion has the radial groove in a radially outer surface of the stud end portion, and
   wherein the at least one collar has the radial protrusion formed at a radially inner portion of the at least one collar.

9. The swivel fitting assembly according to claim 1, wherein, in the lock state, the force generated by the fluid pressure in the fluid passage is transmitted to the at least one collar via an inclined interface to provide a component of radial and axial compressive force.

10. The swivel fitting assembly according to claim 1, wherein the at least one collar is a first collar, the swivel lock including a second collar arranged radially between first collar and the receiving end portion of the female body, wherein the second collar is operatively attached to or unitary with the female body.

11. The swivel fitting assembly according to claim 10, wherein the second collar includes a tapered surface at a radially inner portion of the second collar that slidingly interfaces with a complementary tapered surface at a radially outer portion of the first collar, wherein the respective tapered surfaces form an inclined interface that, in the lock state, transmits force from the second collar into both radial and axial components of force to the first collar, in which the compressive force applied by the first collar to the stud end portion includes corresponding radial and axial components of force.

12. The swivel fitting assembly according to claim 11, wherein, in the lock state, the force generated by the fluid pressure in the fluid passage includes a separation force that forces the female body and male fitting body apart, and wherein the second collar is operatively attached to the female body such that the separation force is transmitted through the female body to the second collar, and transmitted from the second collar to the first collar via the inclined interface.

13. The swivel fitting assembly according to claim 10, wherein the first collar provides a mechanical advantage and serves as a force-amplification device in cooperation with the second collar.

14. The swivel fitting assembly according to claim 13,
    wherein the second collar has a tapered surface at a radially inner portion of the second collar that forms a wedge-shaped gap, in cross-section, in a space between the second collar and the stud end portion, and
    wherein the first collar has a tapered surface at a radially outer portion of the first collar that forms a wedge, in cross-section, that is further wedged into the wedge-shaped gap in the lock state, and is further moved out of the wedge-shaped gap in the release state.

15. The swivel fitting assembly according to claim 1, wherein the first connection end portion of the female body is configured as a push-to-connect connector, and wherein the female body is made with plastic.

16. The swivel fitting assembly according to claim 1, wherein the second connection end portion of the male fitting body is configured as a threaded male nipple.

17. A swivel fitting assembly comprising:
    a fitting body having a threaded end opposite a stud end, the stud end of the fitting body rotatably supporting a push to connect fitting, the stud end having a male portion positioned within a female portion of the push to connect fitting;
    an annular seal positioned on an exterior cylindrical surface of the male portion of the stud end and sealing against an interior cylindrical surface of the female portion of the push to connect fitting;
    a retaining mechanism comprising a first collar member attached to the interior cylindrical surface of the female portion of the push to connect fitting and a second collar member positioned about the exterior cylindrical surface of the male portion of the stud end of the fitting body and having a radially inward extending portion extending partially into a slot in the exterior cylindrical surface of the male portion of the stud end;

wherein the second collar being configured to transition between a lock state and a release state in response to fluid pressure in the fluid passage, such that fluid pressure in the fluid passage that meets or exceeds a predefined level generates a force that transitions the second collar to the lock state in which the second collar engages against the stud end portion of the male fitting body and generates a compressive force that rotationally locks the male fitting body relative to the female body, and such that fluid pressure in the fluid passage that is below the predefined level, or the absence of fluid pressure, enables the second collar to transition to the release state in which the male fitting body and the female body are rotatable relative to each other;

wherein the retaining mechanism retains the push to connect fitting on the fitting body in a manner allowing the push to connect fitting to rotate about an axis of the fitting body.

18. The swivel fitting assembly of claim 17, wherein the second collar member is a split collar, and wherein the first collar and the second collar each have frustoconical surfaces which axially engage each other between the exterior cylindrical surface of the male portion of the stud end and the interior cylindrical surface of the female portion of the push to connect fitting.

19. The swivel fitting assembly of claim 17, wherein when the fitting assembly is under pressure the first collar is pushed axially into the second collar which moves the second collar to more forcefully engage the exterior cylindrical surface of the male portion of the stud end and help prevent the push to connect portion of the fitting from rotating.

* * * * *